(12) United States Patent
Kwak et al.

(10) Patent No.: US 7,164,425 B2
(45) Date of Patent: Jan. 16, 2007

(54) METHOD AND SYSTEM FOR HIGH SPEED NETWORK APPLICATION

(75) Inventors: David T. Kwak, Newport Coast, CA (US); Oscar J. Grijalva, Cypress, CA (US)

(73) Assignee: QLogic Corporation, Aliso Viejo, CA (US)

(*) Notice: Subject to any disclaimer, the term of this patent is extended or adjusted under 35 U.S.C. 154(b) by 266 days.

(21) Appl. No.: 11/018,055

(22) Filed: Dec. 21, 2004

(65) Prior Publication Data

US 2006/0132490 A1    Jun. 22, 2006

(51) Int. Cl.
G09G 5/36    (2006.01)
G06F 12/00    (2006.01)
G06F 11/00    (2006.01)
G06F 13/28    (2006.01)
G06F 13/00    (2006.01)
G06F 3/00    (2006.01)

(52) U.S. Cl. .................... 345/556; 345/536; 345/545; 370/229; 370/235; 709/201; 709/233; 710/25; 710/29

(58) Field of Classification Search ........ 345/534–537, 345/545, 551, 556, 558, 574; 370/229–230, 370/232, 235; 398/53, 154, 161; 709/201, 709/233, 234; 710/29, 18, 22, 25
See application file for complete search history.

(56) References Cited

U.S. PATENT DOCUMENTS

| | | |
|---|---|---|
| 4,268,906 A | 5/1981 | Bourke et al. |
| 4,333,143 A | 6/1982 | Calder |
| 4,449,182 A | 5/1984 | Rubinson |
| 4,549,263 A | 10/1985 | Calder |
| 4,777,595 A | 10/1988 | Strecker et al. |
| 4,783,730 A | 11/1988 | Fischer |
| 4,783,739 A | 11/1988 | Calder |
| 4,803,622 A | 2/1989 | Bain, Jr. et al. |
| 5,129,064 A | 7/1992 | Fogg, Jr. et al. |
| 5,212,795 A | 5/1993 | Hendry |
| 5,249,279 A | 9/1993 | Schmenk et al. |
| 5,276,807 A | 1/1994 | Kodama et al. |
| 5,280,587 A | 1/1994 | Shimodaira et al. |

(Continued)

FOREIGN PATENT DOCUMENTS

EP    0738978    10/1996

(Continued)

Primary Examiner—Wesner Sajous
(74) Attorney, Agent, or Firm—Klein, O'Neill & Singh, LLP (57) ABSTRACT

A method and system for monitoring frame flow in a Fiber Channel network is provided. The method includes, deleting fill words before any frame data is allowed to be stored in a buffer memory; storing only certain primitive signals and/or frame data in the buffer memory; reading the buffer memory without delay, if a primitive signal is stored in the buffer memory; and delaying reading the buffer memory if frame data is detected. The network includes, a host bus adapter that includes a fiber channel protocol manager that includes a receive logic that deletes fill words before any frame data is allowed to be stored in a buffer memory, wherein the buffer memory stores only certain primitive signals and/or frame data and the buffer memory is read without any delay, if a primitive signal is stored, while a read operation of the buffer memory involving frame data is delayed.

18 Claims, 9 Drawing Sheets

U.S. PATENT DOCUMENTS

| | | | |
|---|---|---|---|
| 5,321,816 A | 6/1994 | Rogan et al. | |
| 5,347,638 A | 9/1994 | Desai et al. | |
| 5,371,861 A | 12/1994 | Keener et al. | |
| 5,448,702 A | 9/1995 | Garcia, Jr. et al. | |
| 5,568,614 A | 10/1996 | Mendelson | |
| 5,647,057 A | 7/1997 | Roden et al. | |
| 5,671,365 A | 9/1997 | Binford et al. | |
| 5,740,467 A | 4/1998 | Chmielecki, Jr. et al. | |
| 5,758,187 A | 5/1998 | Young | |
| 5,761,427 A | 6/1998 | Shah et al. | |
| 5,828,903 A | 10/1998 | Sethuram et al. | |
| 5,875,343 A | 2/1999 | Binford et al. | |
| 5,881,296 A | 3/1999 | Williams et al. | |
| 5,892,969 A | 4/1999 | Young | |
| 5,905,905 A | 5/1999 | Dailey et al. | |
| 5,917,723 A | 6/1999 | Binford | |
| 5,968,143 A | 10/1999 | Chisholm et al. | |
| 5,983,292 A | 11/1999 | Nordstrom et al. | |
| 6,006,340 A | 12/1999 | O'Connell | |
| 6,049,802 A | 4/2000 | Waggener, Jr. et al. | |
| 6,055,603 A | 4/2000 | Ofer et al. | |
| 6,078,970 A | 6/2000 | Nordstrom et al. | |
| 6,085,277 A | 7/2000 | Nordstrom et al. | |
| 6,115,761 A | 9/2000 | Daniel et al. | |
| 6,138,176 A | 10/2000 | McDonald et al. | |
| 6,185,620 B1 | 2/2001 | Weber et al. | |
| 6,233,244 B1 | 5/2001 | Runaldue et al. | |
| 6,269,413 B1 | 7/2001 | Sherlock | |
| 6,343,324 B1 | 1/2002 | Hubis et al. | |
| 6,434,630 B1 | 8/2002 | Micalizzi, Jr. et al. | |
| 6,457,090 B1 | 9/2002 | Young | |
| 6,463,032 B1 | 10/2002 | Lau et al. | |
| 6,502,189 B1 | 12/2002 | Westby | |
| 6,504,846 B1 | 1/2003 | Yu et al. | |
| 6,546,010 B1 | 4/2003 | Merchant et al. | |
| 6,564,271 B1 | 5/2003 | Micalizzi, Jr. et al. | |
| 6,721,799 B1 | 4/2004 | Slivkoff | |
| 6,775,693 B1 | 8/2004 | Adams | |
| 6,810,440 B1 | 10/2004 | Micalizzi, Jr. et al. | |
| 6,810,442 B1 | 10/2004 | Lin et al. | |
| 2003/0056000 A1 | 3/2003 | Mullendore et al. | |
| 2003/0126320 A1 | 7/2003 | Liu et al. | |
| 2003/0236953 A1 | 12/2003 | Grieff et al. | |
| 2004/0136711 A1* | 7/2004 | Finan et al. | 398/59 |
| 2005/0131987 A1* | 6/2005 | Chen et al. | 709/201 |

FOREIGN PATENT DOCUMENTS

| | | |
|---|---|---|
| EP | 1059588 | 12/2000 |
| WO | WO 95/06286 | 3/1995 |
| WO | WO 00/58843 | 10/2000 |

\* cited by examiner

| SOF | HDR 1 | HDR 3 | HDR 5 | PL1 | PL3 | PL5 | PL7 | PLn | EOF |
|---|---|---|---|---|---|---|---|---|---|
| R_RDY | HDR 0 | HDR 2 | HDR 4 | PL0 | PL2 | PL4 | PL6 | PL8 | CRC |

METHOD AND SYSTEM FOR HIGH SPEED NETWORK APPLICATION

BACKGROUND

1. Field of the Invention

The present invention relates to computing systems, and more particularly to processing frames at high speeds.

2. Background of the Invention

Storage area networks ("SANs") are commonly used where plural memory storage devices are made available to various host computing systems. Data in a SAN is typically moved between plural host systems (that include computer systems, servers etc.) and storage systems (or storage devices, used interchangeably throughout this specification) through various controllers/adapters.

Host systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety.

PCI-Express is another Input/Output ("I/O") bus standard (incorporated herein by reference in its entirety) that is compatible with existing PCI cards using the PCI bus. PCI-Express uses discrete logical layers to process inbound and outbound information.

Various other standard interfaces are also used to move data between host systems and storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others.

Networks in general and SANs in particular are now expected to operate at high speeds for example, at a rate greater than 4 Gigabits per second ("GB") (for example, 10 GB). HBAs often use an elasticity receive first-in-first out ("FIFO") buffer to stage incoming frames from the network. When frames enter an HBA at high speeds, there is not enough time to insert or delete fill-words. If the rate at which frames enter the FIFO is higher than the rate at which the FIFO is read, then the FIFO can over flow (or overrun). If the rate at which the FIFO is filled is lower than the rate at which the FIFO is being read, then the FIFO can be under run (or under flow).

HBAs operating at high speeds may have to widen the local bus, for example, for a HBA supporting a 10 GB link may have to use a 64-bit bus. A serial/de-serializer ("SERDES") is used to extract a receive clock (Rx_Clk) from incoming frames (i.e. frames that enter the HBA). Data is read from the FIFO at a different clock (may be called a system clock and is also referred to as FPM Clock) than the Rx_CLK.

Conventional FIFO schemes fail to solve the over flow/under flow conditions and hence fail to meet the demands imposed by high operational speeds (for example, a speed of 10 GB).

Therefore, there is a need for a method and system in a HBA that can operate with frequency mismatch conditions of a wider bus and also operate efficiently so that it does not over flow/under flow.

SUMMARY OF THE INVENTION

In one aspect of the present invention, a method for monitoring frame flow in a Fibre Channel network is provided. The method includes, deleting fill words before any frame data is allowed to be stored in a buffer memory; storing only certain primitive signals and/or frame data in the buffer memory; reading the buffer memory without delay, if a primitive signal is stored in the buffer memory; and delaying reading the buffer memory if frame data is detected.

The buffer memory is based on a First in-First out system and the primitive signals include a R_RDY, a BB_SC, and/or a BB_SCr.

In yet another aspect of the present invention, a HBA for processing fibre channel frames is provided. The HBA includes a fibre channel protocol manager ("FPM") that includes receive logic that deletes fill words before any frame data is allowed to be stored in a buffer memory, wherein the buffer memory stores only certain primitive signals and/or frame data and the buffer memory is read without any delay, if a primitive signal is stored, while a read operation of the buffer memory involving frame data is delayed.

In yet another aspect of the present invention, a storage area network ("SAN") is provided. The SAN includes, a host bus adapter for processing fibre channel frames, including a fibre channel protocol manager ("FPM") that includes receive logic that deletes fill words before any frame data is allowed to be stored in a buffer memory, wherein the buffer memory stores only certain primitive signals and/or frame data and the buffer memory is read without any delay, if a primitive signal is stored, while a read operation of the buffer memory involving frame data is delayed.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"BB_SCs": Flow control primitive signal used for credit recovery involving lost frames.

"BB_SCr": Flow control primitive signal used for credit recovery of lost R_RDYs.

"Fibre channel ANSI Standard": The standard describes the physical interface, transmission and signaling protocol of a high performance serial link for support of other high level protocols associated with IPI, SCSI, IP, ATM and others.

"R_RDY": Flow control primitive signal used for establishing credit. Receiving an R_RDY increases credit, while sending an R_RDY decreases credit.

To facilitate an understanding of the preferred embodiment, the general architecture and operation of a SAN, and a HBA will be described. The specific architecture and operation of the preferred embodiment will then be described with reference to the general architecture of the SAN and HBA.

Figure 1A:
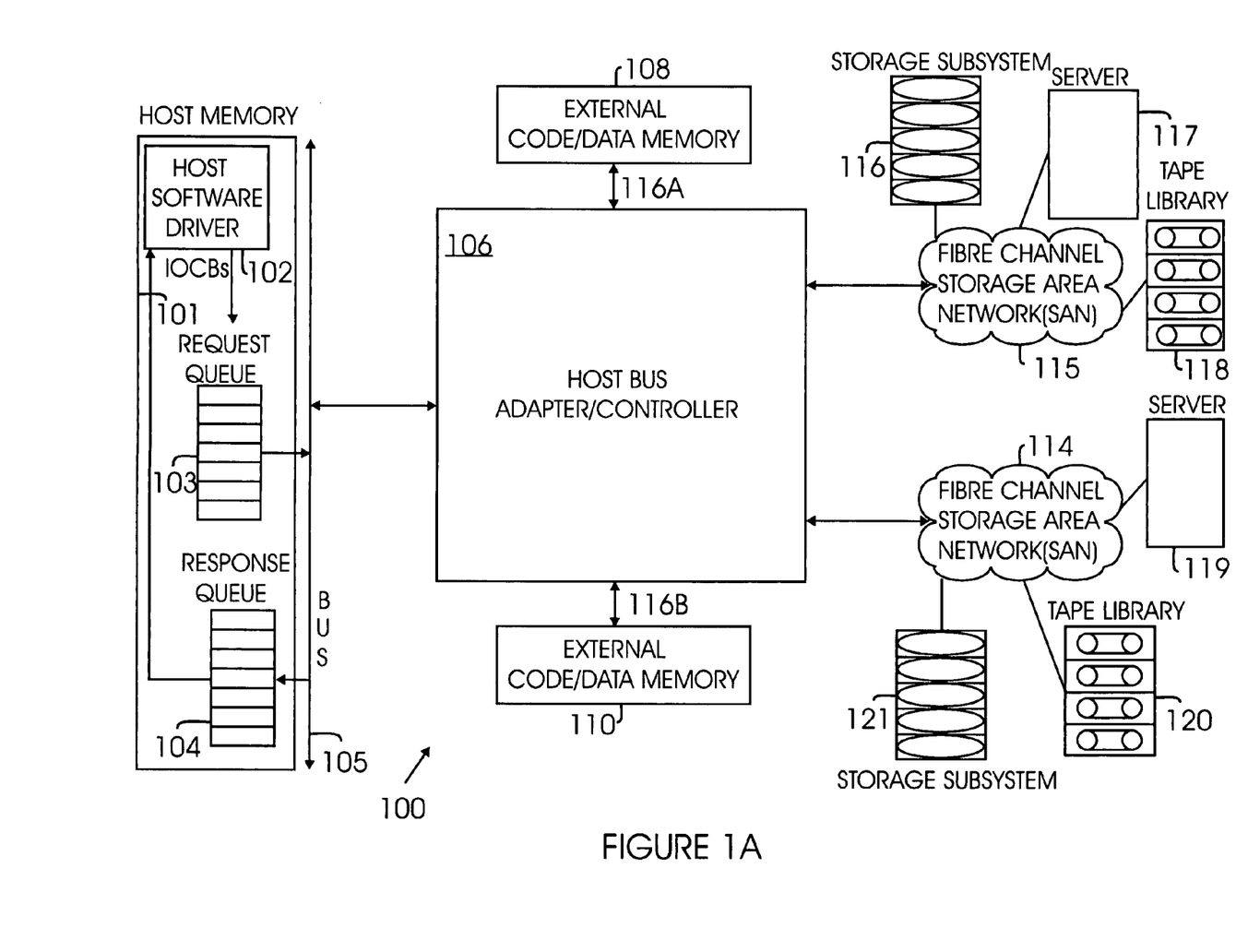
FIG. 1A is a block diagram showing various components of a SAN.

SAN Overview:

FIG. 1A shows a SAN system 100 that uses a HBA 106 (referred to as "adapter 106") for communication between a host system with host memory 101 to various storage systems (for example, storage subsystem 116 and 121, tape library 118 and 120) using fibre channel storage area networks 114 and 115. Servers 117 and 119 can also access the storage sub-systems (for example, 116 and 121) using SAN 115 and 114, respectively.

Host memory 101 includes a driver 102 that co-ordinates all data transfer via adapter 106 using input/output control blocks ("IOCBs").

A request queue 103 and response queue 104 is maintained in host memory 101 for transferring information using adapter 106. Host system communicates with adapter 106 via bus 105 (PCI or PCI-Express).

Figure 1B:
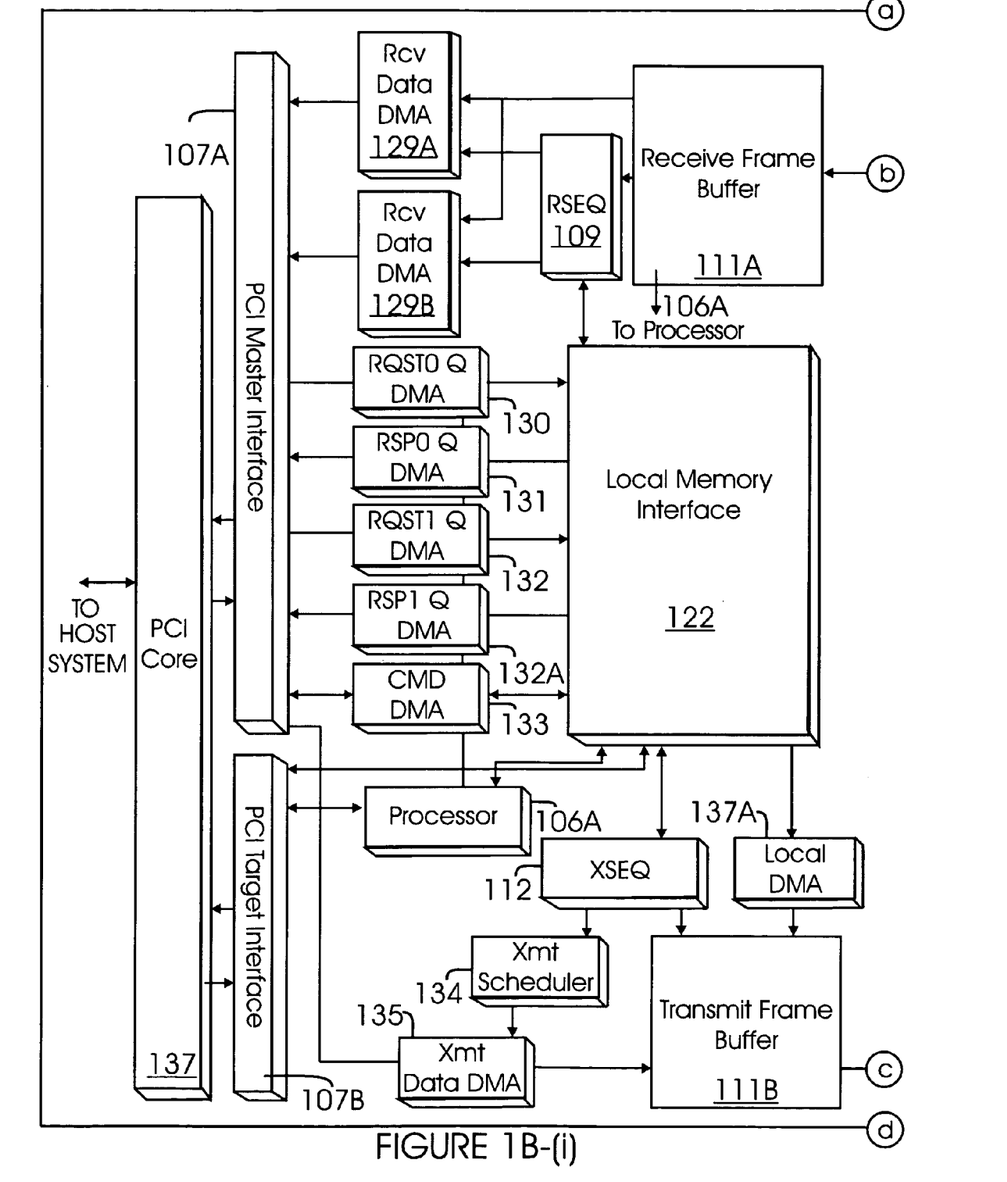
FIG. 1B is a block diagram of a host bus adapter used according to one aspect of the present invention.

HBA 106:

FIG. 1B shows a block diagram of adapter 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory 108 and 110 via connection 116A (FIG. 1A) (referred interchangeably, hereinafter) and local memory interface 122. Memory interface 122 is provided for managing local memory 108 and 110. Local DMA module 137A is used for gaining access to a channel to move data from local memory (108/110). Adapter 106 also includes a serial/de-serializer (shown as "XGXS/SERDES") 136 for converting data from 10-bit to 8-bit format and vice-versa, and is described below in detail.

Adapter 106 also includes request queue DMA channel (0) 130, response queue (0) DMA channel 131, response queue (1) 132A, and request queue (1) DMA channel 132 that interface with request queue 103 and response queue 104; and a command DMA channel 133 for managing command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

A host processor (not shown) sets up shared data structures in buffer memory 108. A host command is stored in buffer 108 and the appropriate sequencer (i.e., 109 or 112) is initialized to execute the command.

PCI master interface 107A and PCI target interface 107B are both coupled to a PCI Core logic 137 (may also be referred to as "logic 137"). Logic 137 is coupled to a host system. Interface 107A and 107B includes an arbitration module that processes DMA access to plural DMA channels.

Figure 2A:
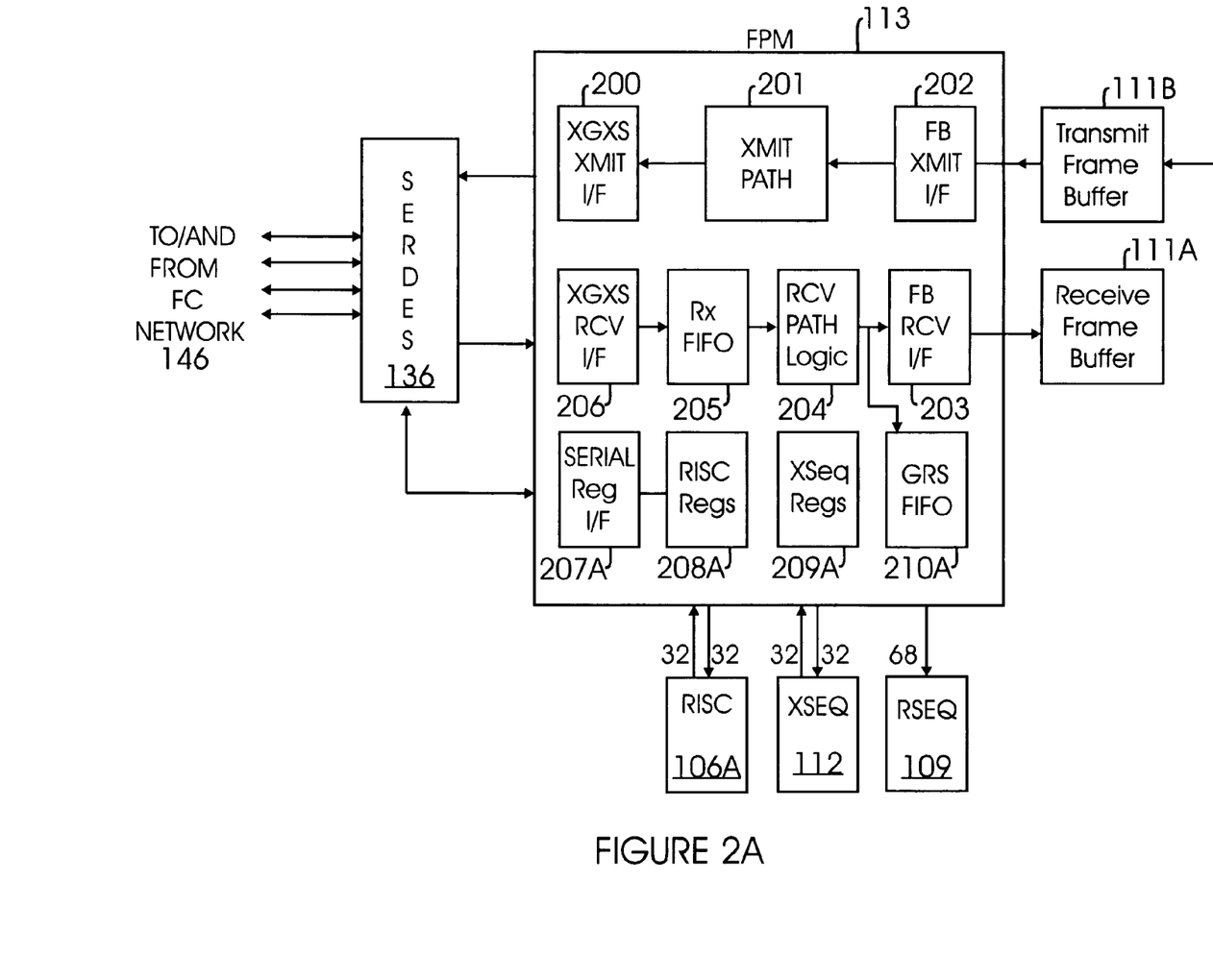
FIGS. 2A–2C show block diagrams of a FPM module, according to one aspect of the present invention.

FPM 113:

FIG. 2A provides a block diagram showing various modules that are used in the receive and transmit paths in FPM 113. Four lanes (shown as 146 in FIGS. 2A–2C) may be used to receive/transmit frames from the fibre channel network. On the receive side, interface 206 (shown as "XGXS RCV I/F") receives frames from SERDES 136 and the frames are sent to receive first in-first out logic "Rx FIFO" 205 that is described below in detail. Logic 205 sends frames to receive path logic (shown as "RCV Path Logic") 204 and then to frame buffer 111A via interface (shown as "FB RCV I/F") 203.

FPM 113 also includes various registers, for example, a serial register interface 207A that interfaces with SERDES 136, register 208A that is used by processor 106A, and register 209A that is used by XSEQ 112. GRS FIFO 210A stores information from incoming frames 146A and is used by RSEQ 109.

Figure 2B:
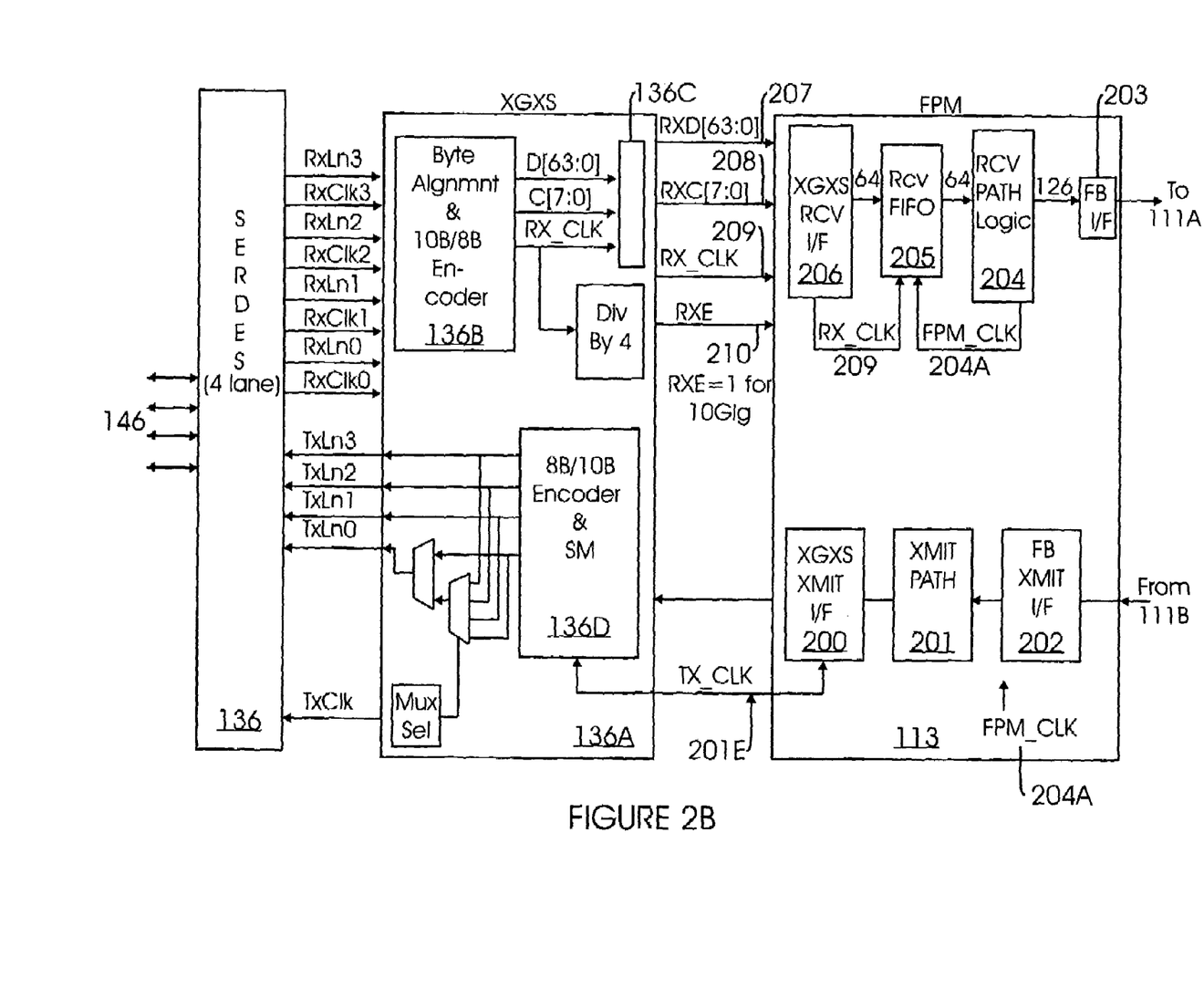

FIG. 2B shows a block diagram showing an XGXS (a 10 Gigabit Extended Sublayer) interface 136A interfacing with FPM 113 components. Interface 136A provides an XGMII to a 10 Gigabit extended Attachment Unit Interface ("XAUI") using a 8-bit to 10 bit encoder/state machine 136D.

On the receive side, frames are received from SERDES 136. For a 10 GB operation, four lanes may be used. SERDES 136 provides both data and clock. FIG. 2B shows data for individual lanes as RxLN0, RXLn1, RxLn2 and RxLN3 and clock as RxClk0, RxClk1, RxClk2 and RxClk3, for lanes 0 to lane 3, respectively.

Frames are aligned and coded from 10-bit to 8-bit by logic 136B and then the data, control and clock information is sent to logic 136C. Logic 136C outputs data 207 (shown as RXD[63:0] (i.e. 64 bits), control signal 208 (shown as RXC [7:0] (i.e. 8 bits), clock(Rx_CLK) 209 and receive data enable ("RXE") signal/bit value (used interchangeably throughout this specification) 210 that is received by XGXS RCV I/F 206. RXE 210 indicates valid data/control signals (i.e. signals 207 and 208). RXE 210 is asserted when receiving data in 10 GB mode, 4 GB mode, 2 GB mode or 1 GB mode.

In one aspect of the present invention, RX_CLK 209 may be 159.375 MHz for 10 GB operation, 106.25 MHz for 2 GB or 53.125 MHz for 1 GB operation. RX_CLK 209 provides the timing and reference for transfer of signals 207 and 208. It is noteworthy that the present invention is not limited to any particular frequency.

As shown in FIG. 2B, receive FIFO logic (shown as "RCV FIFO") 205 operates under two different clocks, Rx_CLK 209 and FPM_CLK (system clock) 204A. Data is received by RCV FIFO logic 205 and then sent to RCV path logic 204 and then to frame buffer 111A via interface ("FB RCV I/F") 203.

The transmit path receives frames from buffer 111B and then through interface (shown as "FB XMIT I/F") 202, transmit path logic 201 (shown as XMIT PATH) and interface ("XGXS XMIT I/F") 200 frames are encoded by module 136 (shown as 8B/10B Encoder & SM (state machine). The four transmit lanes into SERDES 136 are shown as TxLn0, TxLn1, TxLn2 and TxLn3. The transmit clock (Tx_CLK) is shown as 201E.

Figure 2C:
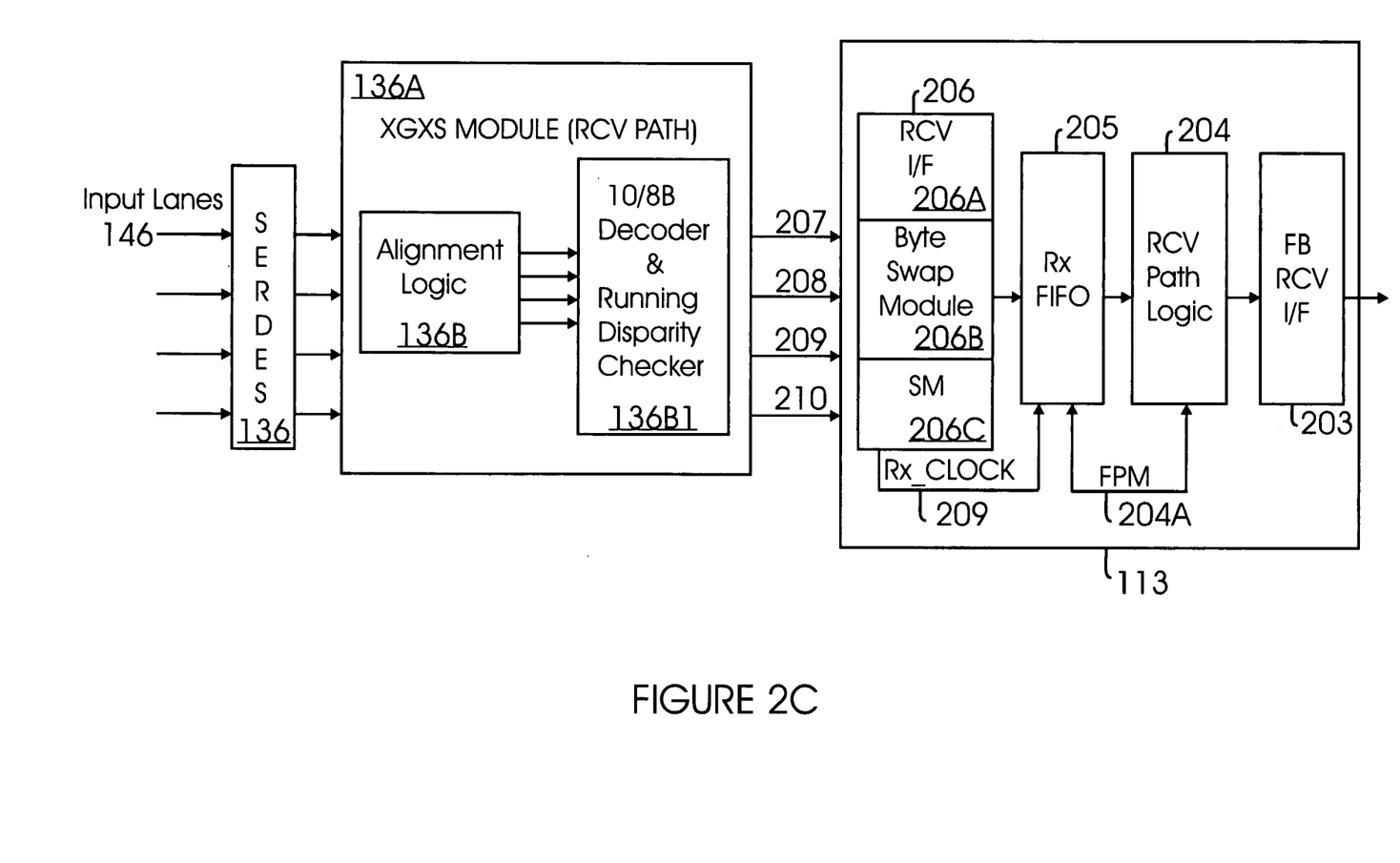

FIG. 2C shows another block diagram with the XGXS module 136A components for the receive path only. In FIG. 2C alignment logic 136B is shown as a separate module, while 10-bit/8-bit decoder and a running disparity checker module 136B1 are shown separately, unlike FIG. 2B where the modules are shown as 136B. This is merely to illustrate the adaptive aspects of the present invention and not to limit the invention to any particular structure of module 136B.

Signals 207–210 described above with respect to FIG. 2B, are sent to FPM 113 and are received by interface 206. Interface 206 includes a receive segment 206A, a byte swap module 206B and a state machine 206C. Byte swap module 206B reorders incoming XGMII format (little endian format) data to fibre channel format (FC-1 layer format, i.e. big endian order). State machine 206C passes received sequences to receive path logic 204 via receive FIFO logic 205.

Received data and control signals (207 and 208) are synchronous to RX_CLK 209, but asynchronous to the FPM clock 204A. In some instances, the frequency mismatch may be 200 ppm.

In one aspect of the present invention, logic 205 absorbs the frequency mismatch and minimizes overflow and underflow conditions in the FIFO (memory storage) space used by logic 205. Only R_RDY, BB_SCs, BB_SCr (fibre channel standard primitive signals) and frame data [start of frame ("SOF") to end of frame ("EOF")] are stored in Rx FIFO logic 205 pipe registers, described below in detail. Primitive sequences are only recognized and reported to processor 106A and not stored in a FIFO. State machine 206C organizes frame data in a known format and fill words, if any, are discarded before data is sent to Rx FIFO logic 205.

Figure 3:
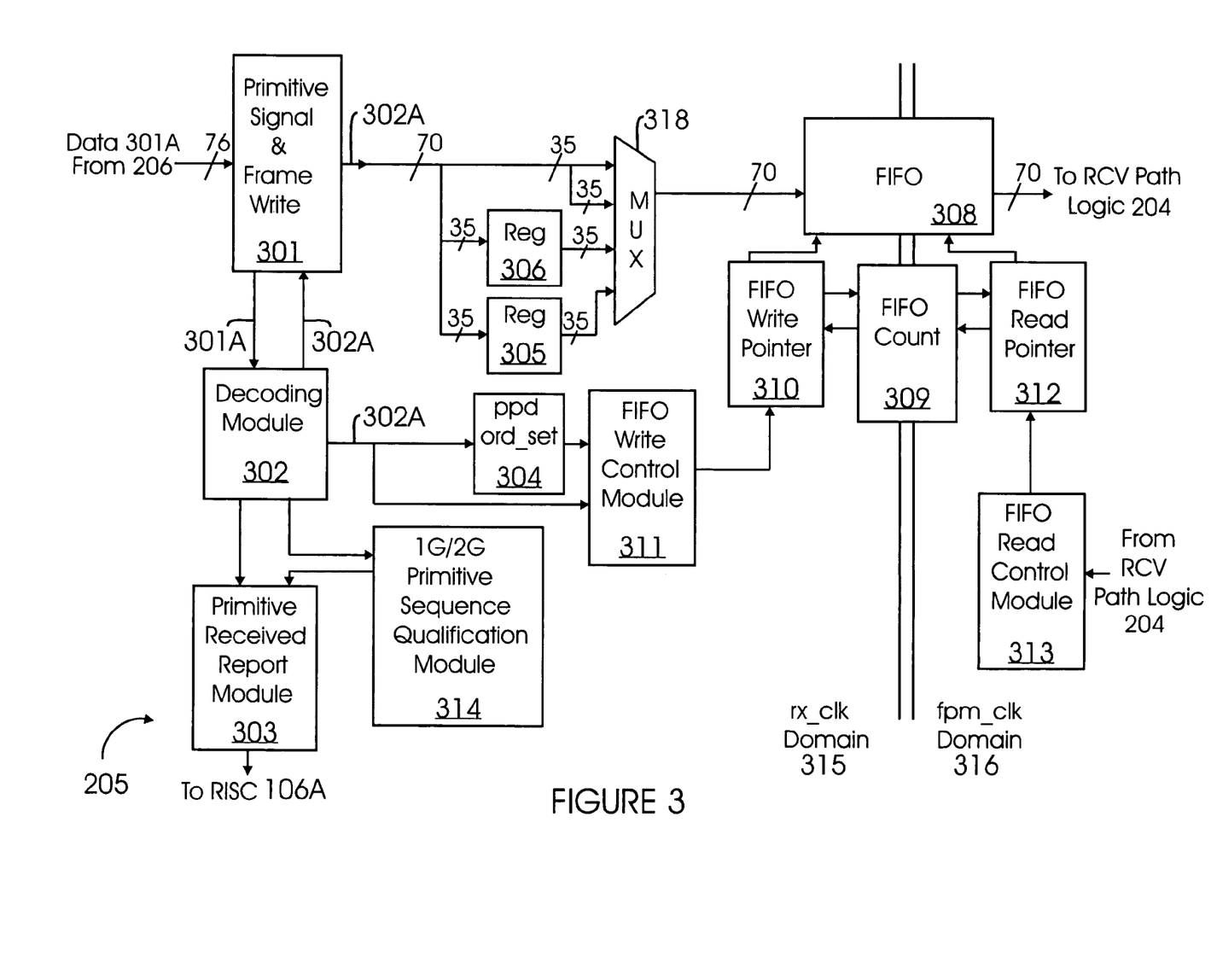
FIG. 3 shows a block diagram of Receive FIFO Logic that is used, according to one aspect of the present invention.

FIG. 3 shows a block diagram of Rx FIFO logic 205, as used according to one aspect of the present invention. FIG. 3 shows receive clock domain 315 (operates under Rx_CLK 209) and FPM clock domain 316 (operates under FPM_CLK 204A), which are asynchronous to each other.

Frames are received from interface 206. In this example, 76 bits are shown entering a primitive signal and frame write module 301. Data from interface 206 generates write enable signals. Data 301A received from interface 206 is sent to a decoding module 302 that decodes and parses data 301A. Decoded data 302A is passed back to module 301 and then sent to pipe registers 305 and 306 as 302A.

Figure 4:
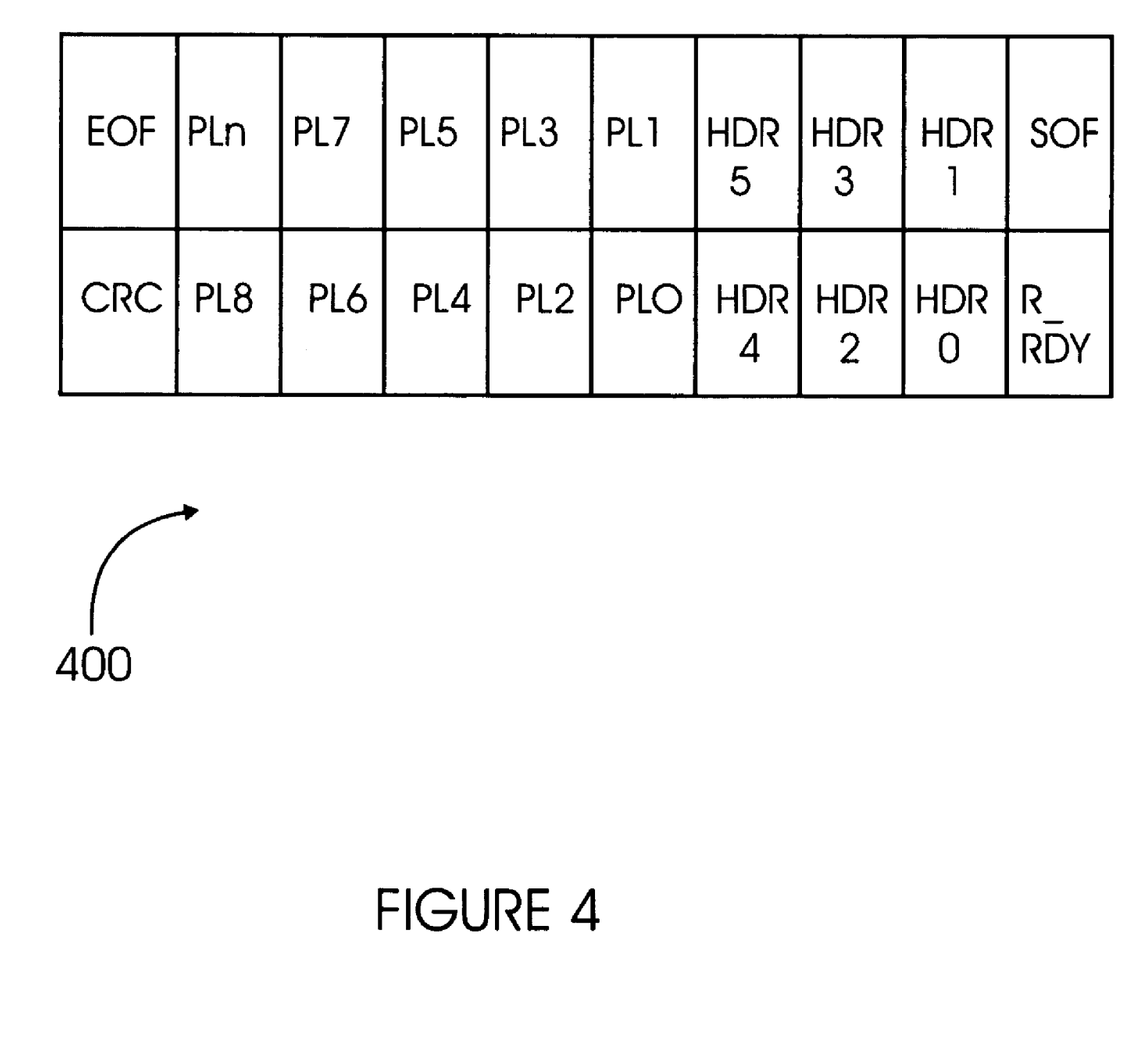
FIG. 4 shows a block diagram of a frame format, used according to one aspect of the present invention.

Registers 305 and 306 are used to reorder the frames to a known format, for example, format 400, as shown in FIG. 4. Format 400 includes various headers (for example, HDR 0, HDR 1 and so forth), Payload (shown as PL0, PL1 and so forth); cyclic redundancy code ("CRC"), start of frame ("SOF"), end of frame ("EOF") and R_RDY.

If primitives, for example, OLS (offline ordered set, defined by the Fibre Channel Standard), NOS (Not Operational Ordered Set, defined by Fibre Channel standards), Link Reset (defined by Fibre Channel standard) are received then module 303 sends the primitive sequences to processor 106A via an interrupt after the primitives are qualified by module 314. These primitives are not written into FIFO 308.

Decoded data 302A is also sent to register 304, which is aligned with registers 305 and 306. Data 302A is also sent to a FIFO write control module 311 that updates a FIFO write pointer 310 and writes data to FIFO 308.

Module 311 sees two stages of data, i.e., one from register 304 and another from decoder 302. Based on that, it determines what needs to be written in FIFO 308. Fill characters are discarded prior to being written in FIFO 308 and hence receive path logic 204 can read data as fast as data becomes available in FIFO 308 and this minimizes the chances of overflow conditions.

A counter 309 (shown as FIFO count) counts what is being written and/or read from FIFO 308. Multiplexer 318 controls what is sent to FIFO 308 (and then to receive path logic 204) based on inputs received from module 301, and registers 305 and 306.

Figure 5:
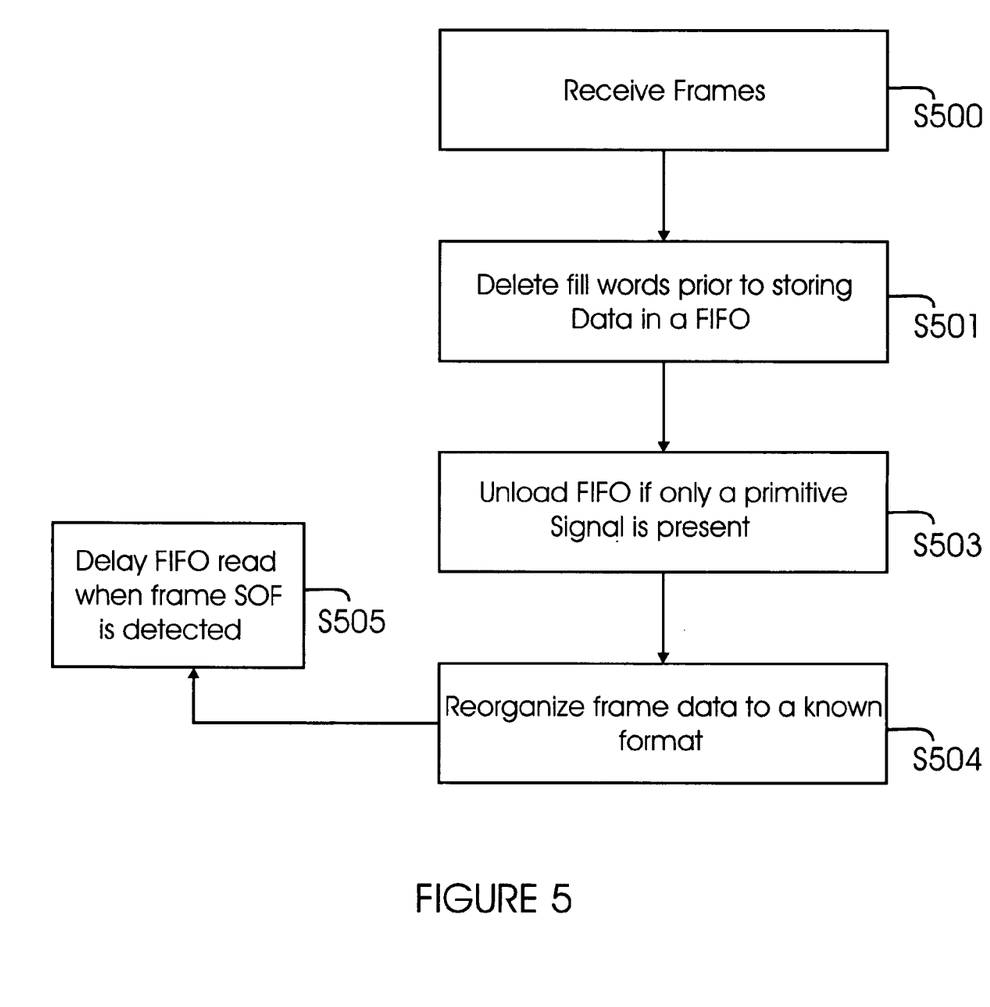
FIG. 5 shows a block diagram of a process flow diagram for processing frames, according to one aspect of the present invention.

Under flow conditions for FIFO 308 are minimized because receive path logic 204 waits until FIFO 308 has enough data before data is moved by logic 204. FIFO read control module 313 using a FIFO read pointer 312 controls this staggered data read process. For example, if a SOF is detected, then FIFO read control module 313 waits until FIFO 308 has at least three words before FIFO 308 is read FIG. 5 shows a process flow diagram for managing FIFO 308, according to one aspect of the present invention. Turning in detail to FIG. 5, in step S500, frames are received from interface 206. Interface 206 receives frames 207, control data 208, RX_CLK 209 and RXE 210 from module 136A that is coupled to SERDES 136.

In step S501, before data is stored in FIFO 308, the all-IDLE fill characters are discarded. Only primitive signals R_RDY, BB_SCrs, BB_SCs, and others, and frame data (SOF to EOF) are stored in pipe registers 304 and 305 before being stored in FIFO 308.

If a primitive signal is stored in FIFO 308, then in step S503, the primitive signal(s) is unloaded immediately, without delay by FIFO read control module 313.

All frame data is organized to a known format in step S504. Pipe registers (305 and 306) are used to reorganize data that is received from interface 206.

In step S505, if a SOF is detected, then FIFO 308 read operation by FIFO read control module 313 is delayed for a certain number of words/period.

In one aspect of the present invention, deleting fill words and delaying the read operation minimize FIFO over flow and under flow conditions.

Although the present invention has been described with reference to specific embodiments, these embodiments are illustrative only and not limiting. Many other applications and embodiments of the present invention will be apparent in light of this disclosure and the following claims.

What is claimed is:

1. A method for monitoring frame flow in a Fibre Channel network, comprising:
    deleting fill words before any frame data is allowed to be stored in a buffer memory;
    storing only certain primitive signals and/or frame data in the buffer memory;
    reading the buffer memory without delay, if a primitive signal is stored in the buffer memory; and
    delaying reading the buffer memory if frame data is detected.

2. The method of claim 1, wherein the buffer memory is based on a First in-First out system.

3. The method of claim 1, wherein the primitive signals include an R_RDY, a BB_SC, and/or a BB_SCr.

4. The method of claim 1, wherein the delay in reading the buffer memory may be for at least three words of received data.

5. The method of claim 1, wherein data is reorganized to a known format before being stored in the buffer memory.

6. The method of claim 5, wherein certain registers in a receive FIFO logic are used to re-organize the data to a known format.

7. A host bus adapter for processing fibre channel frames, comprising:
    a fibre channel protocol manager ("FPM") that includes receive logic that deletes fill words before any frame data is allowed to be stored in a buffer memory, wherein the buffer memory stores only certain primitive signals and/or frame data and the buffer memory is read without any delay, if a primitive signal is stored, while a read operation of the buffer memory involving frame data is delayed.

8. The host bus adapter of claim 7, wherein the buffer memory is based on a first-in0first out system.

9. The host bus adapter of claim 7, wherein the primitive signals include R_RDY, a BB_SC and/or a BB_SCr.

10. The host bus adapter of claim 7, wherein delay in reading the buffer memory may be for at least three words of received data.

11. The host bus adapter of claim 7, wherein data is re-organized to a known format before being stored in the buffer memory.

12. The host bus adapter of claim 11, wherein certain registers are used to re-organize the data to a known format.

13. A storage area network ("SAN") comprising:
    a host bus adapter for processing fibre channel frames, including a fibre channel protocol manager ("FPM") that includes receive logic that deletes fill words before any frame data is allowed to be stored in a buffer memory, wherein the buffer memory stores only certain primitive signals and/or frame data and the buffer memory is read without any delay, if a primitive signal is stored, while a read operation of the buffer memory involving frame data is delayed.

14. The SAN of claim 13, wherein the buffer memory is based on a first-in-first out system.

15. The SAN of claim 13, wherein the primitive signals include R_RDY, a BB_SC and/or a BB_SCr.

16. The SAN of claim 13, wherein delay in reading the buffer memory may be for at least three words of received data.

17. The SAN of claim 13, wherein data is re-organized to a known format before being stored in the buffer memory.

18. The SAN of claim 17, wherein certain registers are used to re-organize the data to a known format.

* * * * *